US009527243B2

(12) United States Patent
Yakubov et al.

(10) Patent No.: US 9,527,243 B2
(45) Date of Patent: *Dec. 27, 2016

(54) LARGE SHELLS MANUFACTURING APPARATUS

(71) Applicant: Massivit 3D Printing Technologies LTD, Lod (IL)

(72) Inventors: Igor Yakubov, Herzliya (IL); Moshe Uzan, Bet Shemesh (IL); Yoav Miller, Rehovot (IL); Itzhak Taff, Yavne (IL)

(73) Assignee: Massivit 3D Printing Technologies LTD, Lod (IL)

( * ) Notice: Subject to any disclaimer, the term of this patent is extended or adjusted under 35 U.S.C. 154(b) by 84 days.

This patent is subject to a terminal disclaimer.

(21) Appl. No.: 14/639,200

(22) Filed: Mar. 5, 2015

(65) Prior Publication Data
US 2015/0314534 A1 Nov. 5, 2015

Related U.S. Application Data

(63) Continuation-in-part of application No. 14/265,586, filed on Apr. 30, 2014, now Pat. No. 8,974,213.

(51) Int. Cl.
| B29C 67/00 | (2006.01) |
| B33Y 10/00 | (2015.01) |
| B33Y 30/00 | (2015.01) |
| B29L 22/00 | (2006.01) |
| B29L 9/00 | (2006.01) |

(52) U.S. Cl.
CPC ....... *B29C 67/0055* (2013.01); *B29C 67/0062* (2013.01); *B29C 67/0092* (2013.01); *B33Y 10/00* (2014.12); *B29C 67/0051* (2013.01); *B29C 67/0059* (2013.01); *B29C 67/0066* (2013.01); *B29C 67/0088* (2013.01); *B29L 2009/00* (2013.01); *B29L 2022/00* (2013.01); *B29L 2022/007* (2013.01); *B33Y 30/00* (2014.12)

(58) Field of Classification Search
CPC ............ B29C 67/0051; B29C 67/0055; B29C 67/0059; B29C 67/0062; B29C 67/0066; B29C 67/0088; B29C 67/0092; B29L 2022/007; B33Y 10/00; B33Y 30/00
USPC ..... 425/174.4, 375; 264/113, 241, 308, 401, 264/405
See application file for complete search history.

(56) References Cited

U.S. PATENT DOCUMENTS

| 5,182,715 A * | 1/1993 | Vorgitch ............. B29C 67/0066 264/401 |
| 6,270,335 B2 * | 8/2001 | Leyden ......................... 425/375 |

(Continued)

*Primary Examiner* — Alison L Hindenlang
*Assistant Examiner* — Lawrence D Hohenbrink, Jr.
(74) *Attorney, Agent, or Firm* — Manelli Selter PLLC; Edward J. Stemberger

(57) ABSTRACT

An apparatus for additive manufacturing of large 3D hollow objects with thin walls, includes a 3D hollow object material deposition module configured to deposit a portion of material forming at least a layer of a 3D hollow object wall; a 3D hollow object material solidifying module configured to solidify at least the portion of material forming at least a layer of the 3D hollow object wall; and a support material dispensing module configured to dispense a support material across a cross section of the 3D hollow object wall. The support material is dispensed separately prior to or concurrently with the deposition of the portion of material forming at least a layer of a 3D hollow object wall.

20 Claims, 14 Drawing Sheets

(56) References Cited

U.S. PATENT DOCUMENTS 6,936,212 B1 * 8/2005 Crawford .................. B28B 1/00
            264/308
2015/0080495 A1 * 3/2015 Heikkila ............. B29C 67/0055
            523/223

* cited by examiner

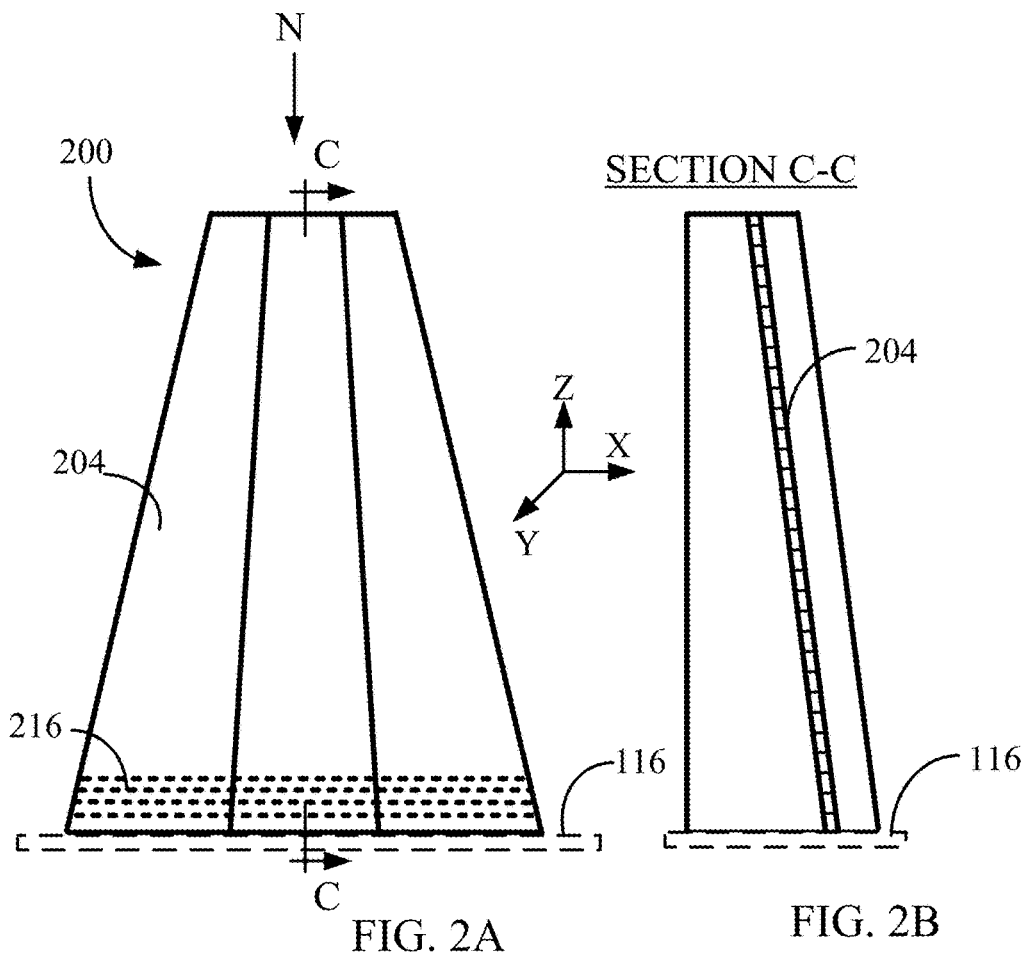
FIG. 2A
FIG. 2B
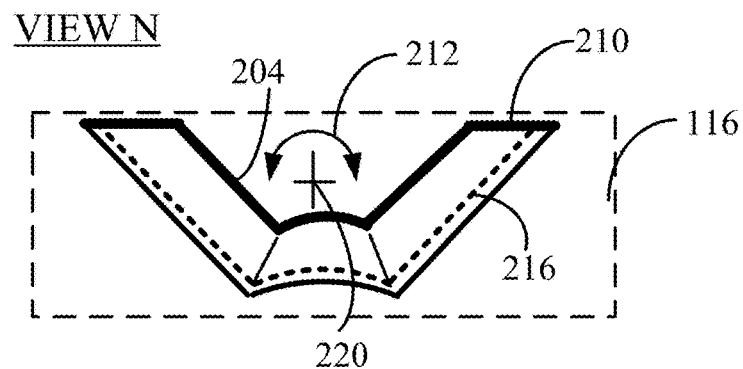
FIG. 2C

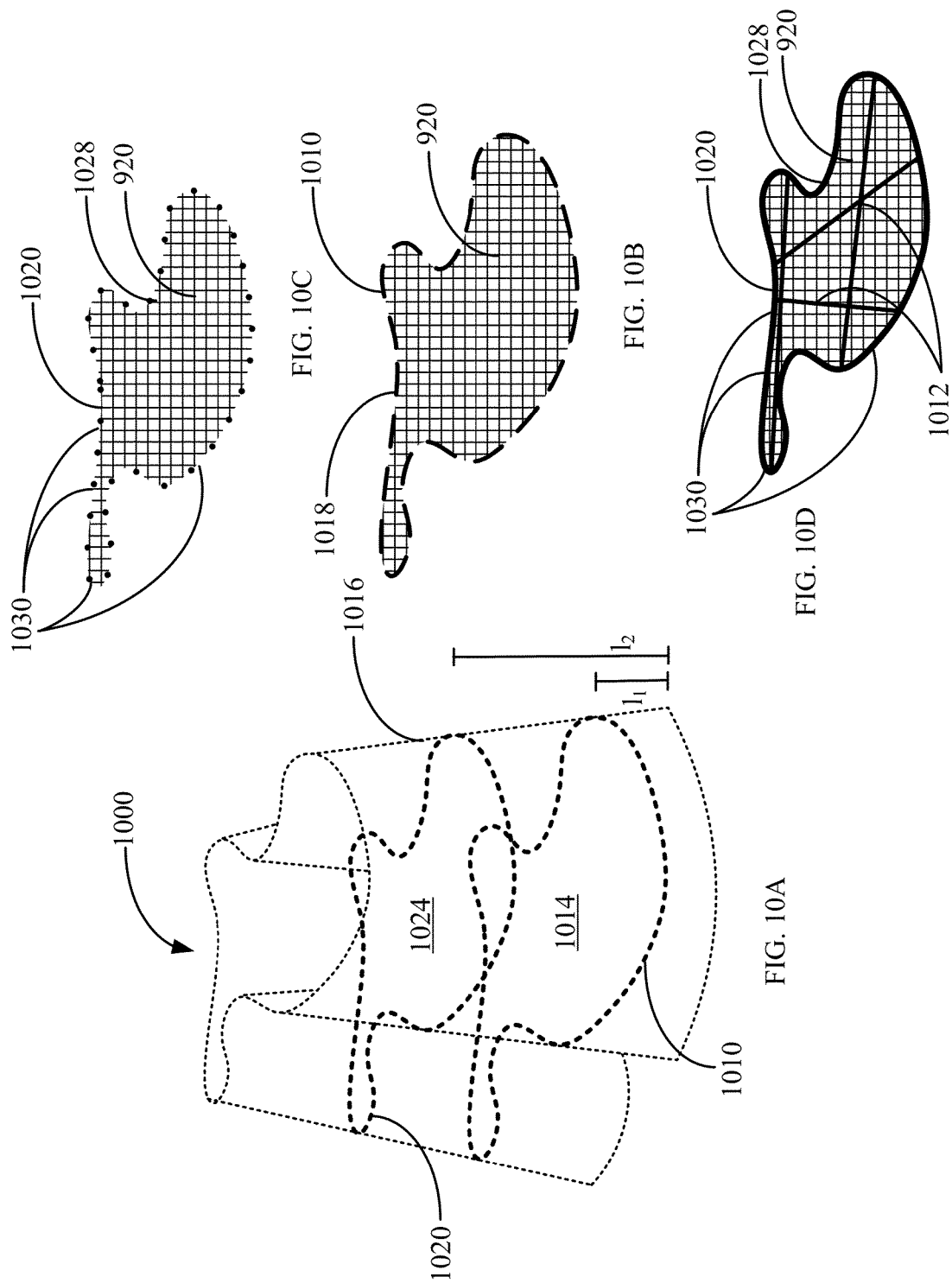

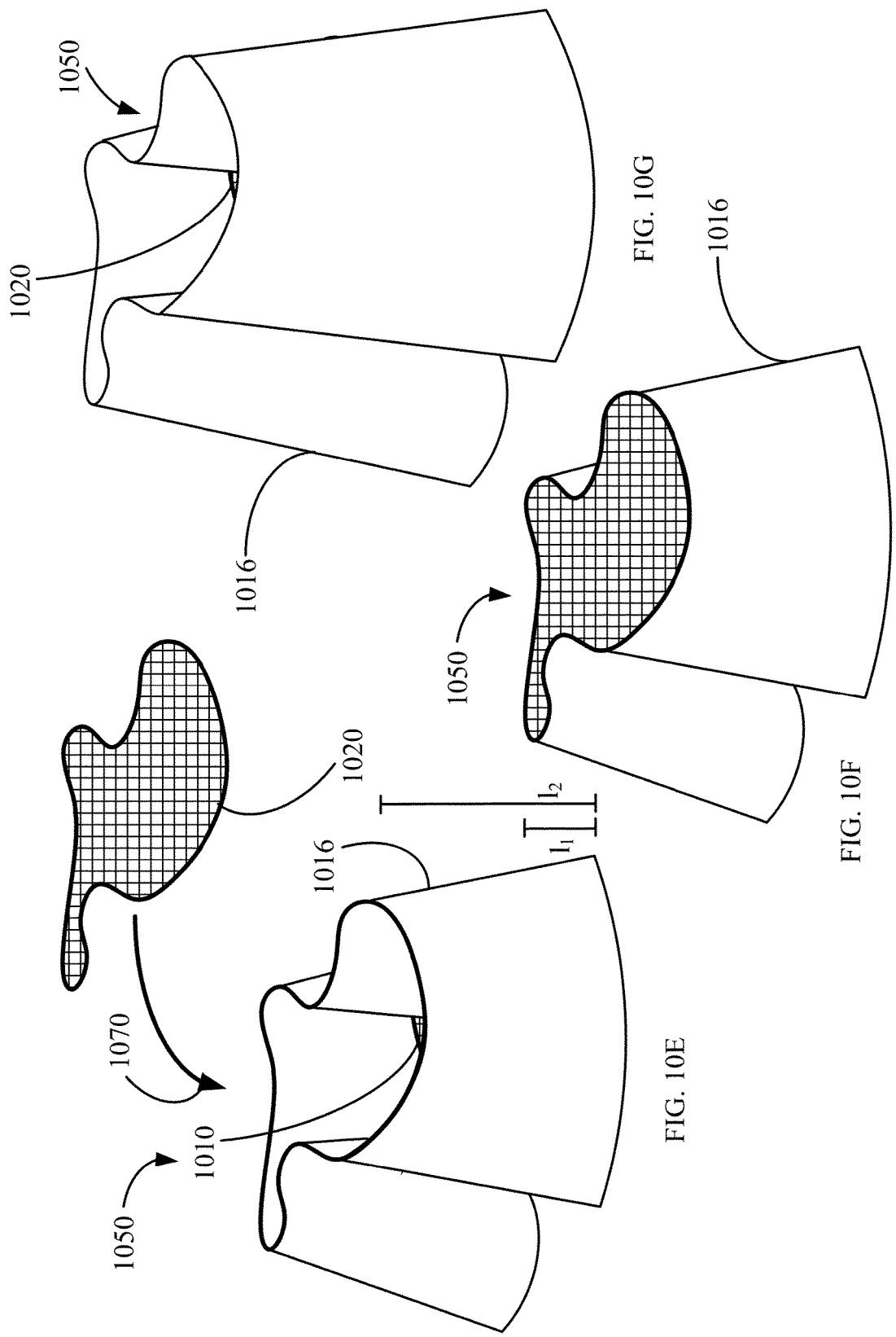

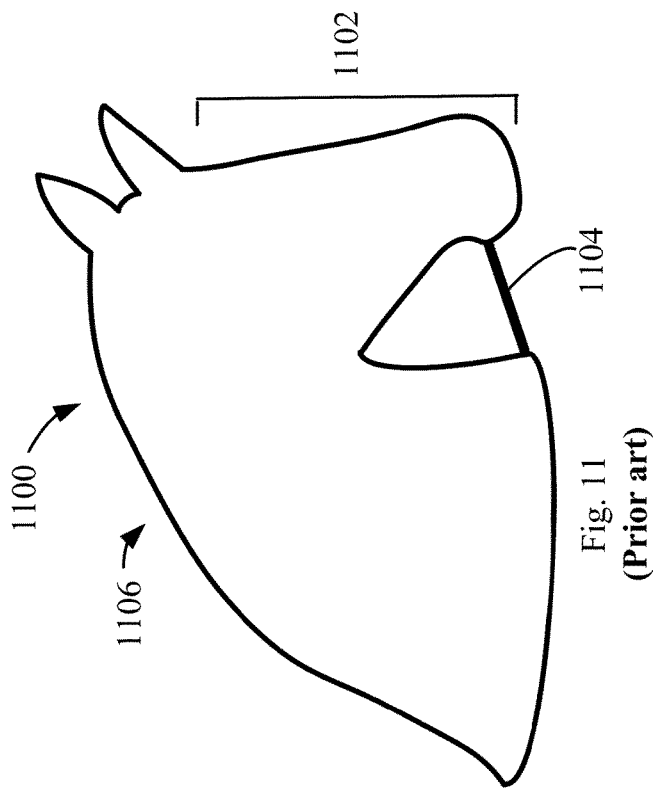
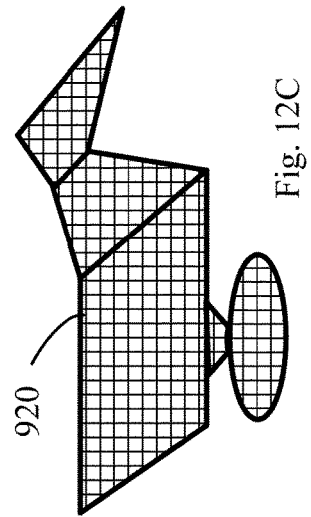
Fig. 12C
Fig. 11
(Prior art)
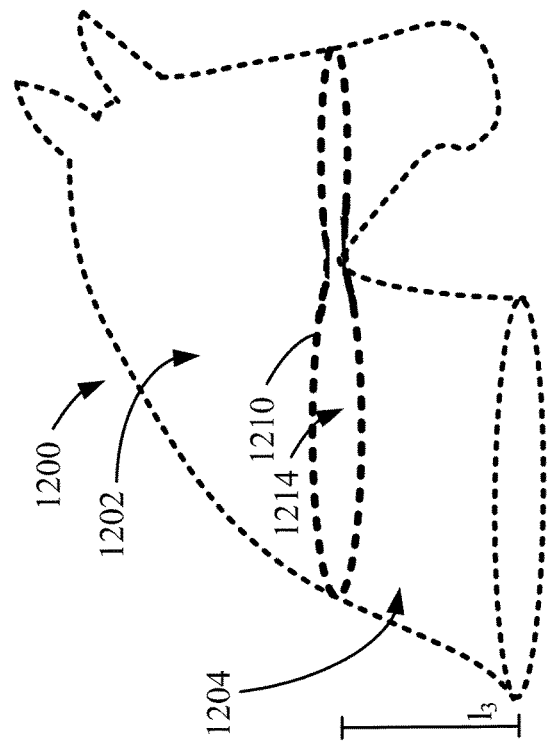
Fig. 12A
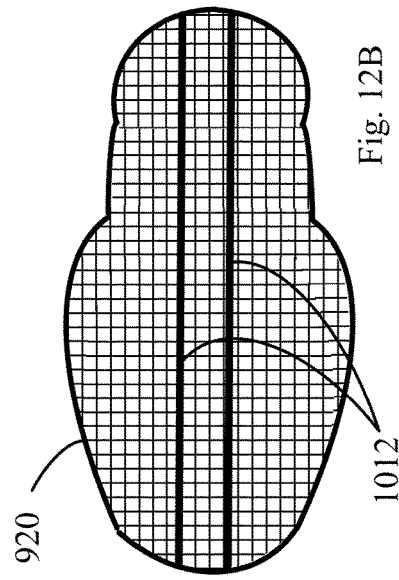
Fig. 12B

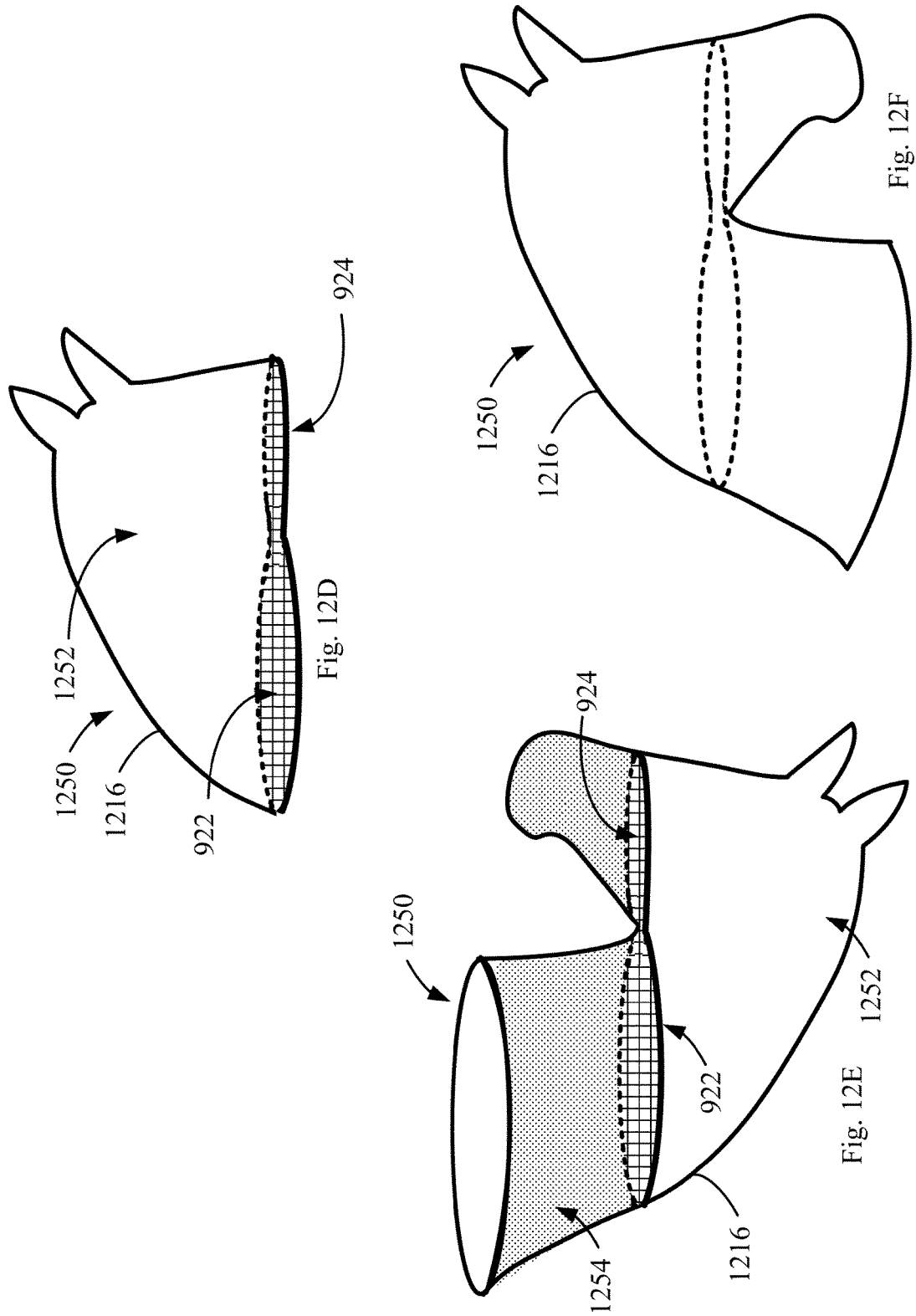

LARGE SHELLS MANUFACTURING APPARATUS

The present application is a continuation-in-part of U.S. patent application Ser. No. 14/265,586 filed on Apr. 30, 2014.

The apparatus and method relate to additive manufacture apparatuses and in particular to manufacture of physical objects such as large shells.

BACKGROUND

Manufacture of three dimensional (3D) models or objects is an additive manufacturing process by means of which a computer generated 3D model is converted into a physical object. The process, sometimes termed stereo-lithography, involves generation of a plurality of material layers of different or identical shapes that are laid down or deposited on top (or bottom) of each of the preceding layer until the amount of layers results in a desired physical object.

The material from which the layers of the physical object are generated could come in liquid, paste, powder, gel and other aggregate state. The materials are dispensed by a plurality of methods including inkjet printing, extrusion and sintering. Conversion of such materials into a solid form is typically performed by suitable actinic radiation and/or heat.

Manufacturing of 3D models and objects spans over a large range of applications. This includes prototype manufacture, small runs of different products manufacture, decorations, sculptures, architectural models, and other physical objects.

Recently, manufacture of relatively large size physical objects and models has become popular. Large size statues, animal figures, signage letter, and decorations are manufactured and used in different carnivals, playgrounds, and supermarkets. Where the manufacturing technology allows, some of these physical objects are manufactured as a single piece at 1:1 scale and some are coming in parts assembled into the physical object at the installation site. Manufacturing of such large objects consumes significant amount of relatively expensive materials and techniques to reduce the amount of the expensive materials by including in the manufactured object different support or reinforcement structures have been developed. Methods for manufacture of such supports or reinforcement structures are described for example, in U.S. Pat. Nos. 5,595,703; 6,797,351; 8,285,411; and US Patent Application Publication 2010/0042241.

Introduction of support or reinforcement structures allows small savings on material costs since some of the objects are manufactured as shells or hollow structures. However, large shells could warp, or otherwise deform even in course of their manufacture and multiple support structures integral with the shells or constructed at the installation sites are required. Since the objects manufactured as shells have their inner space hollow or empty, the support structures are mounted or manufactured to be located in these hollow spaces. Although for some shells, the support structures located in the hollow inner space are not sufficient and frequently they become augmented with outer support structure that in addition to cost adversely affect the visual appearance of the object. These support structures significantly increase the object production time, consume costly material, and require additional labor to install them and to remove some of the unnecessary material.

GLOSSARY

"Shell"—as used in the current disclosure the term shell means a structure or a physical object, usually hollow inside, the wall thickness of which is small compared to its other dimensions. The shell structure could be a curved structure with a curvature of second or higher power; although in some examples it could have certain flatness or flat segments.

"Curvature"—as used in the current disclosure the term curvature is the amount by which a geometric object deviates from being flat, or straight in the case of a line.

"Curvature change ratio"—as used in the current disclosure the term curvature change ratio means the ratio of the change in the angle or slope of a line tangent that moves over a given segment of a curve or arc. First derivative defines a slope of the line tangent to the curve.

"3D physical object shell material" or "shell material"—as used in the current disclosure means the material from which the shell is manufactured.

"Support material" and "grid"—as used interchangeably in the current disclosure the term support material means material from which the shell material support is made.

"Frequency of support material dispensing"—as used in the current disclosure the term frequency of support material dispensing means the frequency of support material dispensing as a function of the curvature change ratio.

"Aspect ratio"—as used in the current disclosure the term aspect ratio means a ratio of the height of the generated feature to the thickness of the generated feature.

"Horizontal plane"—as used in the current disclosure horizontal plane means a plane normal to the gravitational force. Vertical plane is a plane perpendicular to the horizontal plane.

"Conventional support"—as used in the current disclosure the term conventional support means support structures known at least from the references listed.

The terms "3D hollow object" and "shell" are used interchangeably in the current disclosure and have the same meaning.

SUMMARY

Disclosed is an apparatus for additive manufacturing of large 3D hollow objects, also termed shells. Such objects typically have thin walls. The apparatus includes a 3D hollow object material deposition module configured to deposit a portion of material forming at least a layer of a 3D object shell wall, a 3D object material solidifying module configured to solidify at least the portion of material forming the layer of the 3D object shell wall; and a support material dispensing module configured to dispense a support material across a cross section of the 3D object.

The 3D hollow object material deposition module of the apparatus could be an inkjet module, an extrusion module, a material sintering module, or any other known material deposition module. The 3D hollow object material solidifying module could be a module configured to provide ultraviolet radiation, infrared radiation, microwave radiation, and heat.

The support material is dispensed across the cross section of the 3D hollow object as a function of at least one of 3D hollow object or shell wall characteristics. The characteristics could include the angle of the 3D hollow object wall with a horizontal surface or wall curvature change ratio. The support material could be one of a group of materials consisting of a metal grid, a plastic grid, a fabric grid, a grid made of material dissolvable in material of which the 3D hollow object is made or made of the same material of which the 3D object is made, and a combination of all of the above.

Upon completion of the 3D hollow object manufacture, the support material becomes embedded into the 3D hollow object material.

The support material dispensing module dispenses the support material more frequent at segments of the 3D hollow object walls with flat and tilted surface that are at large tilt angles with respect to horizontal surfaces. For curved walls the frequency of the support material dispensing is a function of curvature change ratio or the angle of the tangent to the curved surface with the horizontal surface, for example, the support material dispensing module dispenses the support material more frequent at segments of the 3D hollow object proximate to the curve maxima, minima or inflection points or at segments with large angles between the tangent to the curved surface with the horizontal surface.

The method of manufacture of 3D hollow objects or shells supports a combined support material dispensing process with use of conventional support structures of 3D hollow object or shell. Conventional type support structures could be implemented concurrently with introduction of a more rigid support material, for example, a metal grid or net could be dispensed instead of a plastic grid. Support material could be dispensed across the whole cross section of the shell including over the hollow spaces to become included in the conventional support structures. This resin reinforces the conventional support structures that now could consume essentially less of expensive 3D object material than support structures without support material would consume. Conventional supports could be introduced at a different frequency or distance between them. The curvature change ratio or the angle of the tangent to the curved surface or flat segments or the shell with the horizontal surfaces would define the frequency of conventional support structures. The conventional support structures could be perpendicular to the support material layers or at an angle to the support material or the 3D hollow object or shell. Different types of conventional supports could be used in a combination with different support materials.

The apparatus for and method of manufacture also support manufacture of 3D hollow objects or shells having appendages obviating the need for external support or construction.

BRIEF DESCRIPTION OF THE DRAWINGS

FIGS. 2A-2C are schematic illustrations of a large 3D hollow objector shell, according to an example;

FIGS. 10A, 10B, 10C, 10D, 10E, 10F, and 10G are schematic illustrations of support material dispensing process for an apparatus for additive manufacturing of large 3D hollow objects or shells, according to another example;

FIG. 11 is a perspective view simplified illustration of an exemplary solution common in the art for manufacturing large scale 3D objects having overhanging appendages; and FIGS. 12A, 12B, 12C, 12D, 12E and 12F, together referred to as FIG. 12, are perspective view and plan view simplified illustrations of implementation of a support material grid in construction of a 3D object having appendages.

DETAILED DESCRIPTION OF EXEMPLARY EMBODIMENTS

In some of the manufacturing applications, where large size 3D objects or models are produced by additive manufacturing processes, the external appearance or segments of the object exposed to an observer is more important than the inner segments or volumes of the 3D hollow object or shell. Such 3D objects are usually manufactured by producing relatively thin shells of for example, shells with walls having 1 mm to 5 mm or even 8 mm thickness. The size of the manufactured 3D object could be significant for example, between 100 mm by 100 mm; 1000 mm by 1000 mm or even 10000 mm by 10000 mm. In addition, the 3D object could include substantial segments with curved surfaces and walls. At certain size of the wall segment, the wall segment tilt and curvature change ratio the shell walls could become not stable and even collapse. Currently, to avoid collapse of the flat tilted and horizontal walls as well as curved walls, such 3D objects or models are manufactured by providing numerous supports structures made of the same material as the 3D object is made. The support structures are typically located in the inner segments of the 3D object. Such support structures are not visible to the observer and do not affect visual perception of the 3D object.

Currently, all systems manufacturing 3D objects operate in raster scanning mode. These support structures significantly increase the 3D hollow object production time, consume costly material, increases final 3D object weight and require additional labor to remove some of the unnecessary material. In some instances, the inner space of such objects could be filled in with porous material. This reduces the weight of the 3D object, but requires significant, typically manual, procedures.

The current document discloses an apparatus and method that support manufacture of large 3D hollow objects or shells with thin walls including curved walls and surfaces with high and low curvature change ratio and alleviate or significantly reduce the need for support structures. Further to this, introduction of support structures becomes a function of the curved wall segment curvature change ratio or the angle between a flat wall and a horizontal surface.

Figure 1:
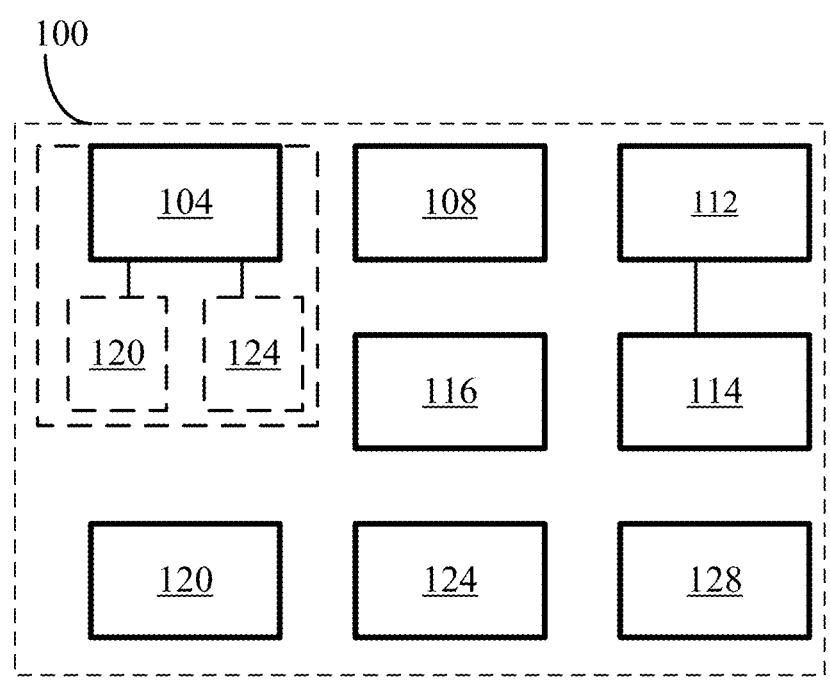
FIG. 1 is a schematic illustration of an apparatus for additive manufacturing of large 3D hollow objects or shells, according to an example.

Reference is made to FIG. 1 which is a schematic illustration of an apparatus for additive manufacturing of 3D objects such as hollow objects with thin walls or shells, according to an example. Apparatus 100 includes a 3D hollow object or shell material deposition module 104 configured to deposit a portion of material forming a segment or a layer 216 (FIG. 2A) of a 3D hollow object 200 or shell wall 204, a 3D object material solidifying module 108 configured to solidify at least the portion of material deposited and forming a segment or a layer 216 of the 3D hollow object or shell 204, and a support material dispensing module 112 configured to dispense a support material across the cross section of the 3D hollow object. Support material dispensing module 112 dispenses the support material, which could be a plastic grid, a metal grid or fabric net and a grid made of the same material of which the 3D object is made across the whole cross section of the 3D hollow object including over the hollow spaces of the 3D object or shell. Support material dispensing module 112 could be configured to dispense a number of different support materials. Alternatively, apparatus 100 could include a number of support material dispensing modules 112-1, 112-2 and so on, with each module configured to dispense different support material. The support material dispensing module 112 could also include a stretching mechanism 114 configured if necessary to stretch and tension each dispensed support material layer to provide the desired level of tension and stability to the 3D object or shell.

Apparatus 100 could also include a computer 128 configured to receive the 3D hollow object design information from a CAD system, adapt the 3D hollow object design information to a particular manufacturing process, and control the apparatus for additive manufacturing of 3D hollow objects or shells.

The 3D hollow object 200 and in particular shell 204 (FIGS. 2A-2C) of the 3D hollow object could be manufactured by employing material deposition module 104 to deposit a plurality of 3D object material layers of different or identical shape. The layers are laid down or deposited on top (or bottom) of each of the preceding layer until the amount of layers results in a desired 3D object. In one example, the 3D object to be manufactured could be located on a support or table 116 configured to move in three directions. The direction could be the know X, Y, and Z axes. Alternatively, instead of moving support table 116 in the three directions, material deposition module 104 could be configured to move in the three directions over the support table 116. In another example, the movement in the three directions could be split between the support table 116 and material deposition module 104.

The 3D physical object material deposition module 104 could employ almost any know material deposition technology. It could be an inkjet module 120, a material extrusion module 124, a material sintering module, and other modules as well as a combination of different material deposition modules. Further to this, each material deposition module 104 could include a plurality of ink ejecting printheads, a plurality of material extrusion nozzles, and a combination of the above. Additionally, the plurality of ink ejecting printheads or the plurality of material extrusion nozzles could be configured to support simultaneous manufacturing of different segments of the 3D hollow object. The plurality of ink ejecting printheads or the plurality of material extrusion nozzles could also be configured to deposit different materials and materials of different color.

The existing 3D manufacturing systems produce 3D objects and shells with their support structures in raster scanning format. Such type of scanning results in long manufacturing times. The present system could form a 3D hollow object or shell 204 in a vector type of movement, significantly reducing the manufacturing time. In some examples, support table 116 with located on it 3D hollow object 200 could be configured to rotate as shown by arrows 212 around an axis 220 (FIG. 2), which could be the Z axis or central axis of the support including rotation about an offset axis when the support is moved in X or Y direction. However, as it will be shown below it is more convenient and simple to move the solidification radiation source or a scanning laser beam.

As shown in FIG. 2A, apparatus 100 forms 3D hollow object 200 or only the shell 204 by depositing a plurality of 3D physical object material layers 216. The layers could be of different or identical shape and they are laid down or deposited on top or bottom of each of the preceding layer until the amount of layers results in a desired 3D hollow object. The material from which the layers of the 3D hollow object are laid down could come in liquid, paste, powder, gel and other aggregate state. The material from which the layers 216 of the 3D hollow object 200 are laid down also could come in a plurality of colors. The colors could be colors such as Gray, Orange, Blue, White, Green, Black, and others. Thick line 210 schematically illustrates the thickness of the object 200 wall.

As it was disclosed above the material from which the layers of the 3D hollow object are laid down could come in a variety of aggregate states. Physical object material solidifying module 108 is configured to solidify or convert these materials into a solid aggregate state. The solidifying module 108 (FIG. 1) typically solidifies the 3D hollow object material layers 212 by material solidifying radiation or simply radiation. In some examples, the 3D hollow object material could include deposition of a number of different materials that solidify by a chemical reaction between them, for example, epoxy like materials. The radiation could be an ultraviolet radiation, infrared radiation, laser radiation, microwave radiation, and heat. Material solidifying module 108 could include a source of radiation emitting one type of radiation or a number of radiation sources emitting different types of 3D object material solidifying radiation.

The 3D object material solidifying radiation could be applied in a flood radiation mode where all of the 3D object material is illuminated/irradiated and solidified, or through a digital mask such as a DLP® modulator or switch commercially available from Texas Instruments, Inc., Dallas Tex. 75201 U.S.A., or in a laser scanning mode. The digital mask (DLP) and laser scanning mode of solidifying radiation application support selective solidification of desired segments of a deposited 3D hollow object material.

Regardless of how and where the successive layers 212 of 3D hollow object material are laid down on a the top or bottom of the previous layer, when the aspect ratio of the manufactured shell with flat vertical or horizontal walls reaches certain proportions the shell tends to collapse. It was experimentally determined that dependent on the type of material deposited, at aspect ratio of 1:10 to 1:100, the shell becomes not stable and as the material deposition continues, the shell tends to collapse. According to an example, the support material dispensing module 112 (FIG. 1) dispenses a support material across a cross section of the 3D hollow object or shell, including hollow spaces, when the 3D object shell vertical walls aspect ratio exceeds at least 1:15 or 1:20. Depending on the aspect ratio of the 3D hollow object walls, material of the walls, cost considerations, and other parameters computer 128 could be configured to adapt operation of support material dispensing module 112 to operate at different aspect ratios, for example at 1:15 or 1:50 or even 1:5. Computer 128 could also be configured, as it will be explained below, to adapt operation of support material dispensing module 112 to dispense support material at different frequency or a different support material a function of the shell wall angle with the horizontal plane. The support material could be such material as a metal grid, a plastic grid, a fabric grid, a grid made of material dissolvable in the 3D physical object material, and a combination of all of the above.

Figure 3A:
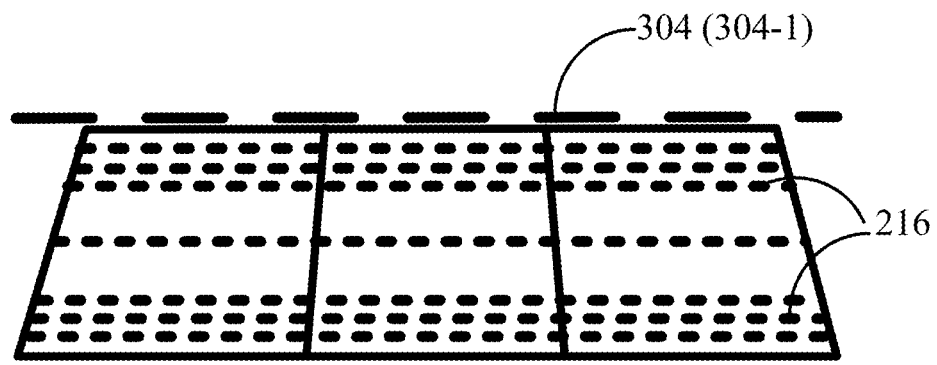
FIGS. 3A-3B are schematic illustrations of a stage in a large 3D hollow object or shell manufacturing according to an example. The figure illustrates shell material deposition process including support material dispensing process.
Figure 3B:
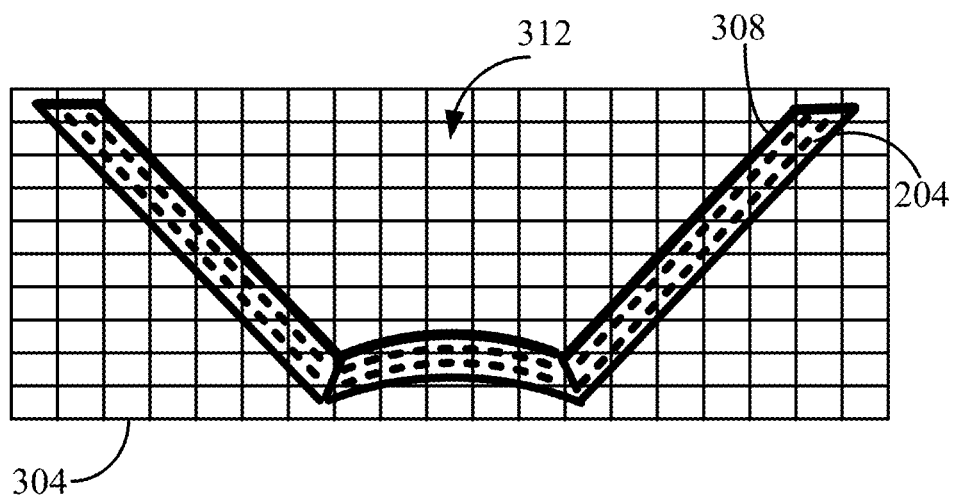

FIGS. 3A-3B are schematic illustrations of a stage in a large 3D hollow object or shell manufacturing according to an example. The figure illustrates 3D hollow object material deposition process including support material dispensing process. The support material dispensing module 112 (FIG. 1) dispenses periodically the support material 304 (304-1) across a cross section 308 of the 3D hollow object 200 including the hollow or empty space 312. The support material could be one of a group of materials consisting of a metal grid, a plastic grid, a fabric grid, a grid made of material dissolvable in the 3D hollow object material, and a combination of all of the above.

According to one example, the period between two successive support material dispenses is generally determined by the time required to deposit a portion of material sufficient to generate a stable segment of a 3D hollow object or shell. The period or frequency of support material dispensing could be set depending on the angle of the walls (tilt) with a horizontal surface, or the curvature change ratio, or on the aspect ratio of which exceeds for example, 1:10 or 1:50 or any other ratio dictated by the material used and other listed above parameters. In some examples, the frequency of support material dispensing could be set according to the requirements of the most critical wall to be manufactured, which could be a curved or tilted wall.

Figure 4A:
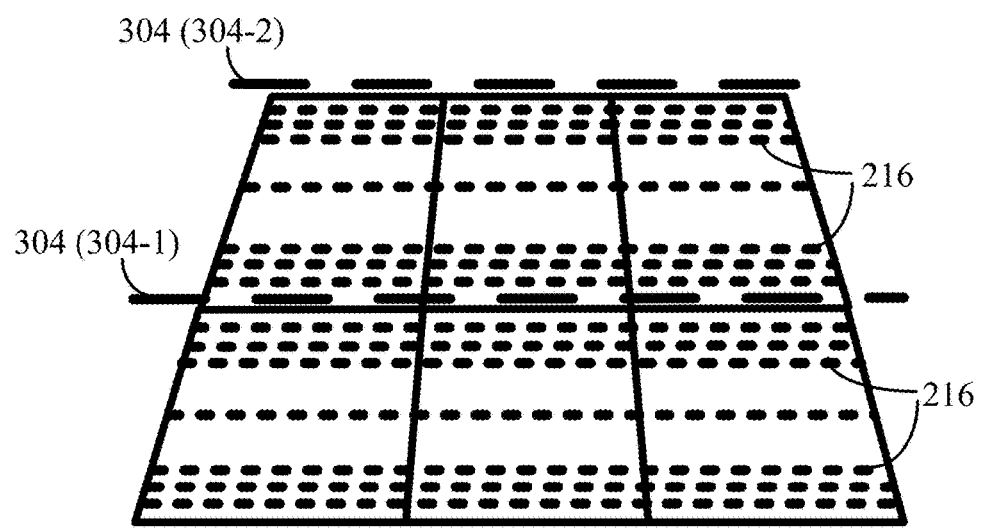
FIGS. 4A-4B are schematic illustrations of a next stage in a large 3D hollow object or shell manufacturing process according to an example. The figure illustrates shell material deposition process including support material dispensing process.
Figure 4B:
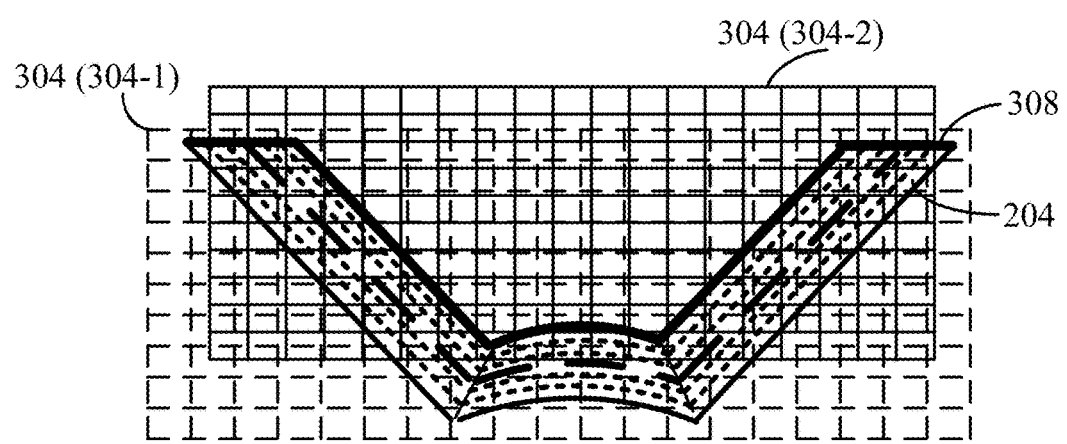
Figure 5A:
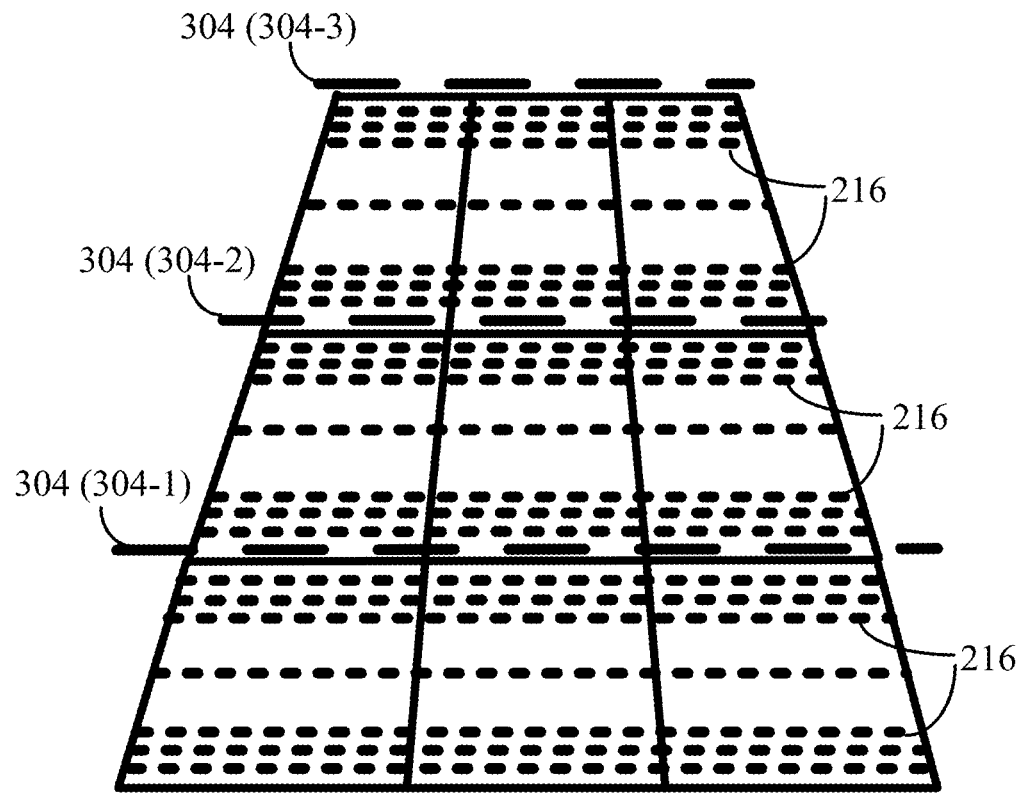
FIGS. 5A-5B are schematic illustrations of a further stage in a large 3D hollow object or shell manufacturing process according to an example. The figure illustrates shell material deposition process including support material dispensing process.
Figure 5B:
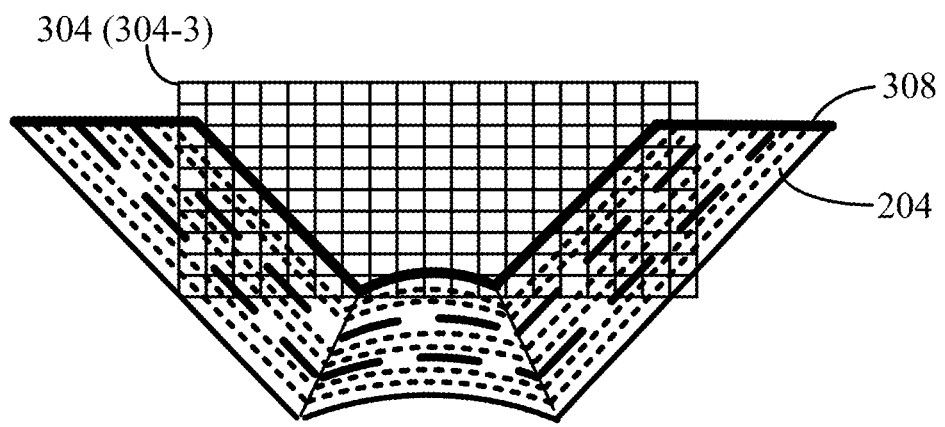

FIGS. 4A-4B and FIGS. 5A-5B illustrate progressive stages in the manufacture of a large 3D hollow object or shell material deposition process including support material dispensing process. FIGS. 4A-4B illustrate the next stage in a large 3D hollow object or shell material 216 deposition process, where following deposition of a number of 3D hollow object or shell material layers 216 a layer of support material 304 (304-1, 304-2; 304-3) is dispensed. The process continues until the manufacture of the 3D physical object shell is completed. The type and size of the support material 304 could be adapted to the particular cross section size and strength.

According to another example the support material dispensing module 112 dispenses periodically the support material across a cross section of the 3D hollow object and the period between two successive support material dispenses is generally a function of the 3D hollow object shell curvature. The shell curvature is typically a second or higher power curvature. It could have curvature maxima and minima points as well as curvature inflection point or points. The support material dispensing module 112 at these points would dispense the support material at a higher frequency than at other segments of the shell. Upon completion of the shell or 3D hollow object manufacture, the excessive support material could be trimmed at least at the external surfaces of the shell. Support material 304 can also be dispensed separately and applied mid-dispensing of the final 3D object as will be explained in greater detail below.

Figure 6:
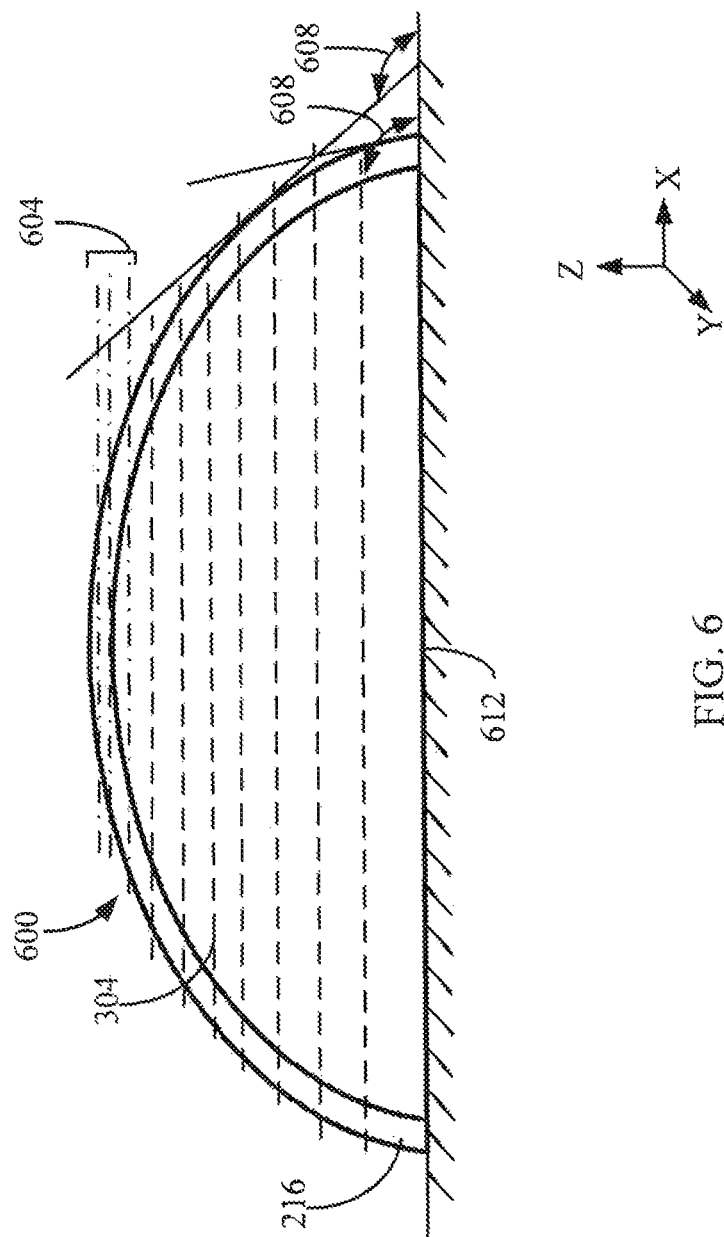
FIG. 6 is a schematic illustration of a support material dispensing process for an apparatus for additive manufacturing of large 3D hollow objects or shells, according to an example.

FIG. 6 is a schematic illustration of a support material dispensing process for an apparatus for additive manufacturing of a 3D hollow object or shell, according to an example. Shell 600, is half of an ellipsoid. Deposition process of shell material 216 is similar to the ones described above. Following deposition of a number of 3D physical object or shell 600 material 216 a layer of support material 304 is dispensed. Support material 304 could be a metal grid, a plastic grid or a grid made from the same material or resin of which the 3D object is made. The frequency of the support material 304 dispensing increases (inversely proportional) as a function of the angle 608 between the 3D object shell and horizontal plane 612 or plane defined by X-Y axes. The larger the angle 608 becomes the more frequent support material 304 is dispensed. The stretching mechanism 114 of support material dispensing module 112 could also be configured to stretch and tension each dispensed support material layer to provide the desired level of tension and stability to the 3D object or shell.

According to one example, concurrently with the increase of the support material 304 dispensing frequency, support material 304, could be replaced by a more rigid support material, for example, a metal grid 604 could be dispensed instead of a plastic grid 304 or plastic or resin grid of different strength and mesh could be dispensed. Support material 304 can also replaced by a separately dispensed support or grid 920 (FIG. 10) and applied mid-dispensing of the final 3D object as will be explained in greater detail below. As it was indicated above, support material dispensing module 112 could be configured to dispense a number of different support materials. Alternatively, apparatus 100 (FIG. 1) could include a number of support material dispensing modules, with each module configured to dispense different support material.

Figure 7:
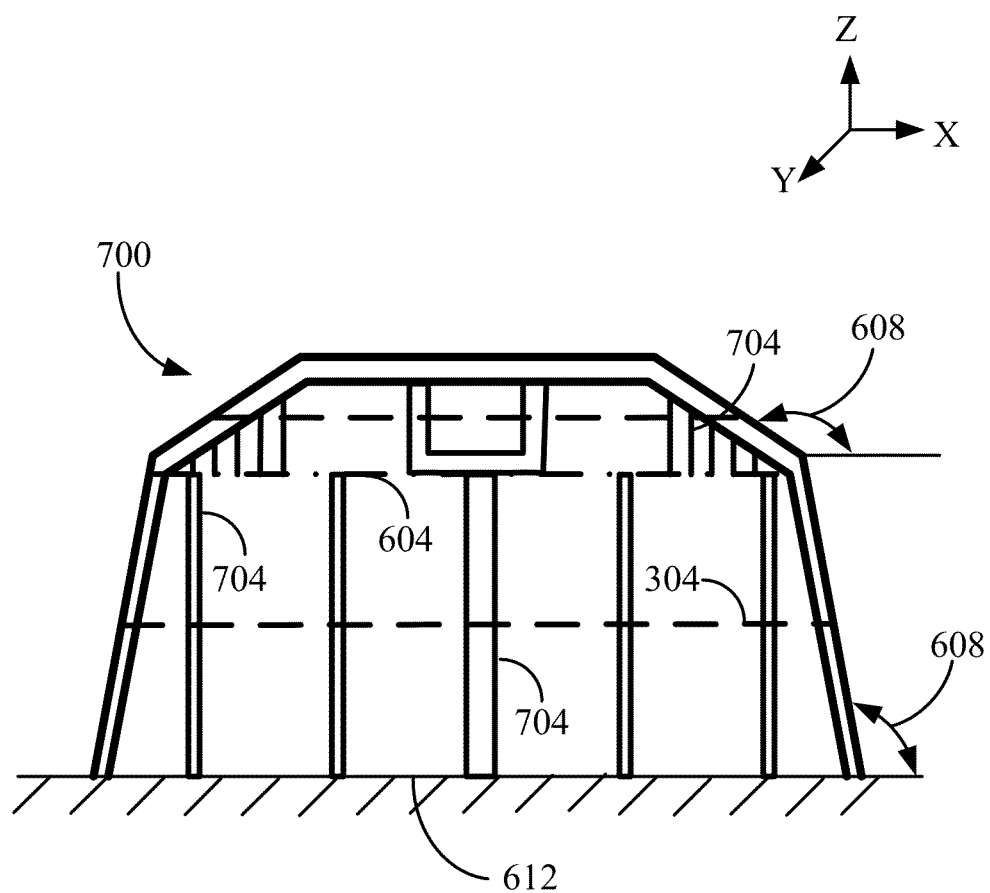
FIG. 7 is a schematic illustration of a combined support material dispensing process with use of conventional support structures for manufacture of large 3D hollow objects or shells, according to an example.

According to one example, and in particular at large angles 608 between the 3D object shell and horizontal plane 612 or plane defined by X-Y axes, support material 304 dispensing frequency could be increased, the level of support material stretching could be changed, or introduction of a more robust support material 604 replacing support material 304 could be implemented. According to another example, and in particular at large angles 608 between the 3D object shell and horizontal plane 612 or plane defined by X-Y axes, concurrently with the use of support material 304 or 604, a plurality of conventional support structures 704 (FIG. 7) could be implemented. FIG. 7 is a schematic illustration of a combined support material dispensing process with use of conventional support structures for manufacture of large 3D hollow objects or shells, according to an example. Conventional type support structures 704 could be implemented concurrently with introduction of a more rigid support material, for example, a metal grid 604 could be dispensed instead of a plastic grid 304. In addition the level of support material stretching could be varied. Properly dispensed and stretched support material provides a sufficient support basis for additional conventional support structures. Since the support material could be dispensed to become included or embedded in the conventional support structures 704 it enforces the conventional support structures 704. Reinforced conventional support structures 704 could consume essentially less of expensive 3D hollow object material than support structures without support material would consume. Upon completion of the shell or 3D hollow object manufacture, the excessive support material 304 or 604 could be trimmed at least at the external surfaces of the shell.

When 3D hollow object walls are at an angle (tilted) to a horizontal surface, the weight of the wall under influence of gravity could develop a force sufficient to distort and even destroy the wall. Depending on the angle at which a particular 3D hollow object wall is oriented to the horizontal plane computer 128 (FIG. 1) could be configured to adapt operation of support material dispensing module 112 to operate at different frequency for manufacture of 3D hollow object walls as a function of the wall angle 608 with the horizontal plane 612. For large angles, for example, 50 degrees to 80 degrees, of the wall with the horizontal plane, computer 128 could operate support material dispensing module 112 at a higher frequency or shorter time intervals than for large angles of the wall with the horizontal plane, for example 50 or 80 degrees or more. In addition the level of support material stretching could be varied. For all practical purposes the frequency of support material dispensing could be adapted to include different wall angles and thicknesses, wall size, wall materials, cost considerations and others.

The conventional support structures could be perpendicular to the shell walls or at an angle to the 3D hollow object or shell walls. Different types of conventional supports could be used in a combination with different support materials.

Figure 8:
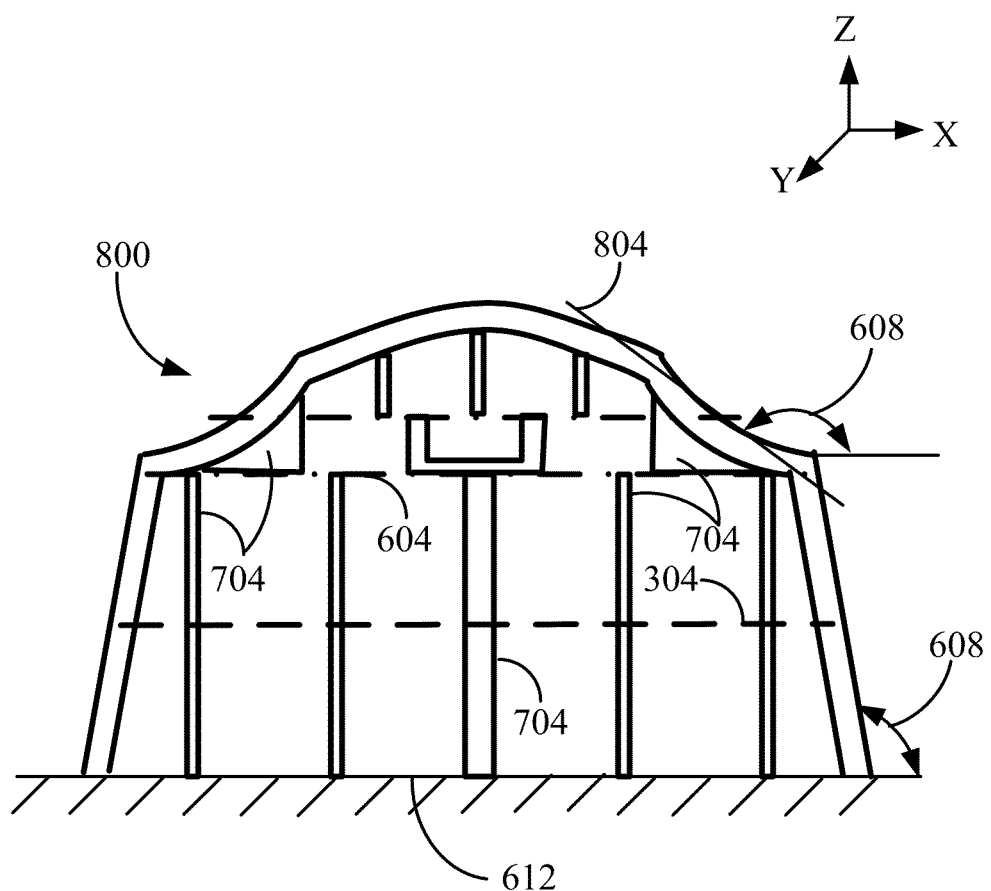
FIG. 8 is a schematic illustration of a combined support material dispensing process with use of conventional support structures of large 3D hollow objects or shells that include flat and curved wall segments.

Usually, 3D hollow objects 200 and 800, as shown in FIGS. 2 and 8 include a mix of plane and curved surfaces. Curved surfaces could be characterized by a curvature change ratio parameter or the change in the angle or slope of a line 804 tangent that moves over a given segment of the curved surface. Similar to the disclosed above considerations computer 128 (FIG. 1) could be configured to operate the support material dispensing module 112 to dispense a support material across a cross section of the 3D hollow object or shell as a function of curvature change ratio.

Computer 128 (FIG. 1) could also be configured to operate the support material dispensing module 112 to dispense a support material across a cross section of the 3D hollow object or shell and account for sudden changes in the weight to be supported. Such sudden changes in the weight could be caused by a snow fall or a rain.

Computer 128 could also be configured to optimize the combination (hybrid) between conventional support 704 and dispensed support material 304 or 604. The optimization could include the number of conventional support structures as a function of shell wall angle or curvature change ratio, cost optimization, and 3D object shell stability. Conventional supports could be introduced to be perpendicular to the support material layers or at an angle to the support material or the 3D object shell. Different types of conventional supports could be used in a combination with support material 304 or 604.

Use of large signage and in particular letters is a one of the applications that the present apparatus could simplify by reducing the amount of material used, reducing the manufacturing time and costs. FIG. 9 is a schematic illustration of stages of manufacture of a large 3D hollow object such as letter A according to the present method, although it is clear that any other letters or shells could be manufactured using apparatus 100 and the manufacturing method described above.

FIG. 9 is a schematic illustration of final stages of manufacture of a large 3D hollow object or shell, which in this particular case is a large size letter A.

Figure 9A:
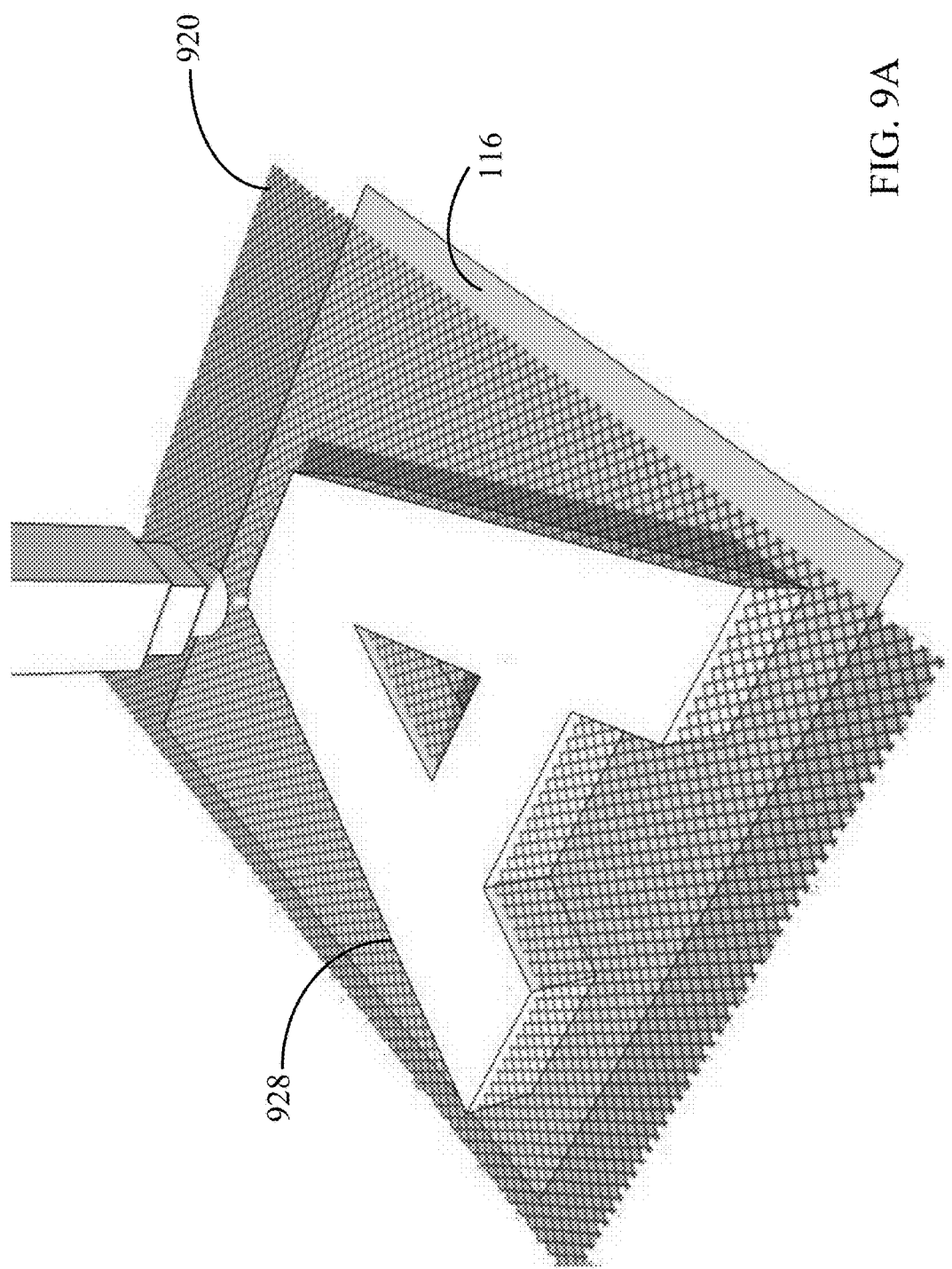
FIGS. 9A and 9B, collectively referred to as FIG. 9 are schematic illustrations of final stages of manufacture of a large 3D hollow objects or shells, according to an example.

In FIG. 9A manufacture of the observable surface 928 of the letter "A" is accomplished and almost ready 3D letter "A" could be safely removed from support 116 of apparatus 100.

Figure 9B:
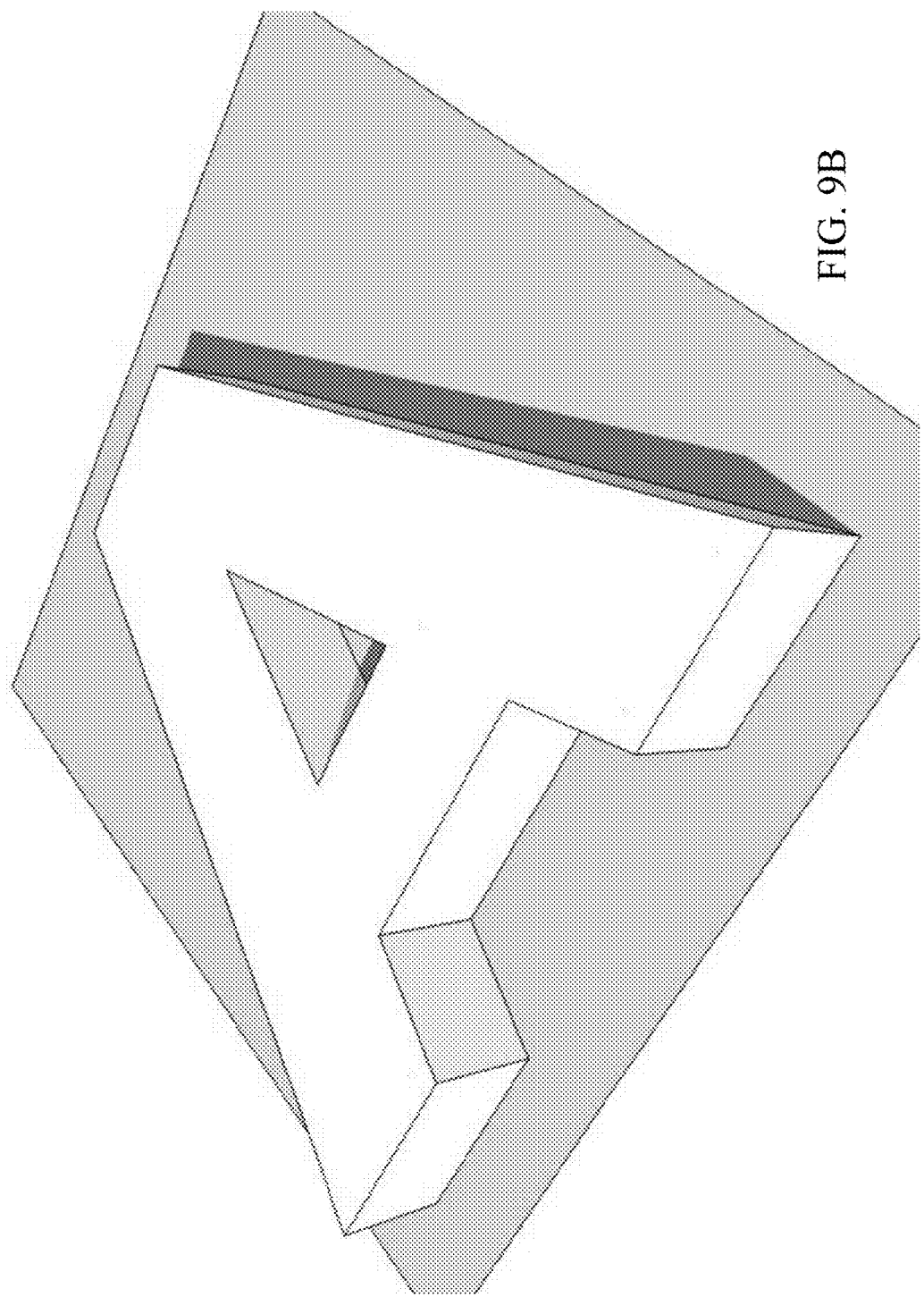

FIG. 9B illustrates a final stage in 3D hollow object (letter "A") manufacturing process. Upon completion of the 3D hollow object manufacture, the excessive support material 920 could be trimmed at least at the external surfaces of the object.

In another example depicted in FIGS. 10A, 10B, 10C, 10D, 10E, 10F and 10G collectively referred to as FIG. 10, support material or grid 920 can be made from the same material (resin) of which the 3D object itself is made and dispensed separately. The separately dispensed support or grid could be placed across a hollow volume of a cross section of the 3D hollow object or shell at a predetermined level.

Grid 920 can be made of a single layer thickness or have a thickness exceeding single layer thickness and include ribs 1012, shown in FIG. 10D to be positioned so that to provide additional strength to grid 920 as required.

An advantage of this technique is in that support material 920 can be integrated into the walls 1016 of the three dimensional object as it is being manufactured without leaving any external appendages or excessive support material 920 that later require trimming or removal at least at the external surfaces of the object or cannot be removed at all as will be described in greater detail below. Another advantage of a separately dispensed support or grid is in shortening the throughput time for manufacturing the 3D object by manufacturing support material 920 separately prior to or concurrently with the manufacturing of the 3D object.

FIG. 10A, which is a perspective view simplified illustration of a computer-generated model 1000 for a 3D object 1050 (FIGS. 10E-10G) to be manufactured, depicts a planned wall 1016 of the planned 3D object 1050. Computer 128 (FIG. 1) could calculate one or more cross-section levels at which positioning of one or more support material 920 grids would provide 3D object 1050 with optimal structural strength and stability.

Generated model 1000 generated by computer 128 can also mark (emphasized in FIG. 10A with thick phantom lines) the exact planned contour outline of planned wall 1016 of 3D object 1050 to be manufactured at a cross-section level ($l_1$; $l_2$) at which support material 920 is to be positioned as determined by computer 128 to provide optimal structural strength and stability. Such contour outlines are marked in FIG. 10A as contour outline 1010 at a first level Op and a contour outline 1020 at a second level ($l_2$) and define the precise borders of support material or grid 920 to be dispensed.

Once the outline of the required support grid is determined by computer 128, material dispensing module 112 (FIG. 1) or a separate material dispensing module (not shown) can separately dispense support material 920 the borders of which are precisely defined by outlines 1010 and 1020 and which can be made from the same material (resin) from which the 3D object is made and at a location other than the location at which the 3D hollow object is being dispensed.

Support material 920 can be dispensed across cross section contour 1010 and across cross section contour 1020 of 3D object 1050 including across the hollow or empty space 1014 inside contour 1010 and empty space 1024 inside contour 1020 so that the borders of support material or grid 920 fit precisely the planned contour outline in accordance with the generated model of 3D object 1050.

As discussed above, support material 920 or grid can be dispensed separately in accordance with the desired planned contour outlines prior to or concurrently with the dispensing of 3D object 1050.

Additionally and optionally, support material 920 can be dispensed along a contour outline such as border 1018 of contour 1010 in a semi-continuous fashion so that to form a non-continuous border such as that depicted in FIG. 10B or, alternatively and optionally, a contour outline such as border 1028 can be dispensed in the form of deposited thickened drops (exceeding thickness of a single layer) so that to form edge anchor bonding points 1030 (FIG. 10C) to be integrated into the later dispensed wall of 3D object 1050. Dispensing support material or grid 920 made from a material being the same or similar to that of which the 3D object is made can contribute to a smooth and simple integration of the materials of support material or grid 920 and the 3D object.

Once the support material or grid 920 has been dispensed as predetermined by computer 128, i.e., in form dictated by contours 1010 and/or 1020, manufacturing of the 3D object can proceed. FIG. 10E, which is a perspective view simplified illustration of a 3D object being manufactured, illustrates partially manufactured 3D object 1050 being manufactured according to computer-generated model 1000 (FIG. 10A) for a 3D object.

In FIG. 10E support material 920 of contour 1010 has already been dispensed and placed at level ($l_1$). At this stage, the manufacturing of 3D object 1050 has ceased at level ($l_2$) so that pre-dispensed support material 920 of contour 1020 can be placed over the cross-section of 3D object 1050 at level ($l_2$) as illustrated in FIG. 10E by an arrow designated reference numeral 1070.

As shown in FIG. 10F, which is a perspective view simplified illustration of a 3D object being manufactured, support material or grid 920 of contour 1020 is in place and manufacturing of 3D object 1050 can continue. FIG. 10G shows a perspective view of the final product with support material 920 of contour 1010 (not shown) and support material 920 of contour 1020 in place. It can be appreciated that upon completion of the 3D hollow object manufacture, support material 920 does not protrude from at least the external surface of 3D object 1050 and hence no further trimming or any other treatment of 3D object 1050 at least external surface is necessary. Another advantage of a separately, pre-dispensed support material or grid 920 is in that it can be employed as a hidden from the eye support for overhanging appendages of the 3D object to be manufactured.

FIG. 11, is a perspective view simplified illustration of an exemplary solution common in the art for manufacturing large scale 3D objects having overhanging appendages. As shown in FIG. 11, which is a large scale head of a horse 1100, the front part 1102 of the horse's head may be quite heavy and must be supported by a beam 1104 to prevent the breakage at the nape of the neck 1106.

FIGS. 12A, 12B, 12C, 12D, 12E and 12F, together referred to as FIG. 12, are perspective view and plan view simplified illustrations of implementation of a support material grid in construction of a 3D object having appendages.

FIG. 12A depicts a computer 128 generated 3D model 1200 and a planned wall 1216 (FIGS. 12D-12F) of the planned 3D horse head 1250 to be manufactured similar to the model 1000 of FIG. 10A. Computer 128 (FIG. 1) could calculate one or more cross-section levels at which positioning of one or more support material 920 grids would provide 3D object 1250 with optimal structural strength and stability.

Once contour and position of one or more support material 920 grids is determined, computer 128 can also define one or more portions of 3D object 1250 to be manufactured on one or more surfaces of support material 920 one or more grids. In FIG. 12A, computer 128 has defined a portion 1202 according to which a first portion 1252 of 3D object 1250 can be manufactured based on a first surface 922 (FIG. 12C) of support material 920 grid and a second portion 1204 according to which a second portion 1254 of 3D object 1250 can be manufactured based on a second surface 924 (FIG. 12D) of support material 920 grid.

In one example grid 920 can have two or more surfaces each surface providing can be flat and have a first surface 922 and a second surface 924 wherein first surface 922 and second surface 924 are on opposite sides of the grid.

Generated model 1200 generated by computer 128 can also mark (emphasized in FIG. 12A with thick phantom lines) the exact planned contour outline of planned wall 1216 of 3D object 1250 to be manufactured at a cross-section level ($l_3$) at which support material 920 is to be positioned as determined by computer 128 to provide optimal structural strength and stability. Such a contour outline is marked in FIG. 12A as contour outline 1210 at a first level ($l_3$) and defines the precise borders of support material or grid 920 to be dispensed. In FIG. 12A, contour 1210 is selected at a level at which a volume defined by the contour at the selected level ($l_3$) has the largest area. However, this is not necessarily a requirement and selected level ($l_3$) is not arbitrary and is determined by computer 128 to provide optimal structural strength and stability of the 3D object to be manufactured.

As shown in FIG. 12B, once the outline of the required support grid is determined by computer 128, material dispensing module 112 (FIG. 1) or a separate material dispensing module (not shown) can separately dispense support material 920 the borders of which are precisely defined by outline 1210 and at a location other than the location at which the 3D hollow object is being dispensed. Support material 920 can be made from the same material (resin) from which the 3D object is made. In FIG. 12B, support material or grid 920 can be made of a single layer thickness or have a thickness exceeding single layer thickness and include ribs 1012, shown in FIG. 12B to be positioned so that to provide additional strength to grid 920 as required.

Support material 920 can be dispensed across cross section contour 1210 of 3D object 1250 including across the hollow or empty space 1214 inside contour 1210 so that the borders of support material or grid 920 fit precisely the planned contour outline in accordance with the generated model of 3D object 1250.

As discussed above, support material 920 or grid can be dispensed separately in accordance with the desired planned contour outlines prior to or concurrently with the dispensing of 3D object 1250.

Support material or grid 920 of FIG. 12B is shown to be flat having two surfaces 922 and 924 (FIGS. 12D and 12E) on opposite sides thereof. However, and as shown in FIG. 12C, support material or grid 920 can have more than two surfaces laying in multiple planes in 3D space as required to provide optimal structural strength and stability of the 3D object to be manufactured.

As illustrated in FIG. 12D, a first surface 922 of support material or grid 920 can, initially, form a base support layer upon which a first portion 1252 of 3D object 1250 can be dispensed. FIG. 12D, which is a perspective view simplified illustration of a 3D object being manufactured, illustrates the complete first portion 1252 of partially manufactured 3D object 1250 manufactured according to computer-generated first portion 1202 of model 1200 (FIG. 12A) for a 3D object.

This point, incomplete 3D object 1250 can be inverted, as illustrated in FIG. 12E. Once inverted, second portion 1254 of 3D object 1250 can be dispensed on second surface 924 of support material or grid 920, completely burying support material or grid 920 inside 3D object 1250 obviating the need for any external support such as a beam 1104 (FIG. 11). Also in this example no further trimming or any other treatment of 3D object 1250 at least external surface is necessary.

FIG. 12F illustrates the final 3D object with no external support or protruding material. Support material or grid 920 is buried inside wall 1216 as outlined by a phantom-line.

The apparatus and method described substantially reduce the time and cost of additive manufacture of the large 3D hollow objects. A combination of conventional supports with support material improves the strength of the 3D hollow objects and reduces their manufacturing cost.

What is claimed is:

1. An apparatus for additive manufacturing of large 3D hollow objects with thin walls, said apparatus comprising:
    a 3D hollow object material deposition module configured to deposit a portion of material forming at least a layer of a 3D hollow object wall;
    a 3D hollow object material solidifying module configured to solidify at least the portion of material forming at least a layer of the 3D hollow object wall; and
    a support material dispensing module including a material stretching mechanism configured to dispense and stretch a support material across a cross section of the 3D hollow object wall; and
    wherein the support material dispensing module is constructed and arranged to dispense the support material separately prior to or concurrently with the deposition of the portion of material forming at least a layer of the 3D hollow object wall and at a location other than the location at which the 3D hollow object is being dispensed.

2. The apparatus according to claim 1, wherein the support material is also dispensed at a location other than that at which the 3D hollow object is being dispensed.

3. The apparatus according to claim 1, also comprising a computer configured to generate a model and mark a planned contour outline of a planned wall of the 3D object to be manufactured at a cross-section level at which the support material is to be positioned to provide optimal structural strength and stability.

4. The apparatus according to claim 3, wherein the support material dispensing module dispenses the support material across a cross section contour of the 3D object including across a hollow or empty space inside the contour so that to fit exactly the planned contour outline in accordance with a generated model of the 3D object.

5. The apparatus according to claim 3, wherein the support material dispensing module dispenses the support material across a cross section contour of the 3D object including across a hollow or empty space inside the contour so that to fit precisely the planned contour outline in accordance with the generated model of the 3D object and leave no appendages or excessive support material that later require trimming or removal at least at external surface of the object.

6. The apparatus according to claim 3, wherein the support material dispensing module dispenses support material along the contour outline or border in at least one of a semi-continuous fashion and in a form of deposited thickened drops so that to form edge anchor bonding points to be integrated into a later dispensed wall of a 3D object.

7. The apparatus according to claim 1, wherein at least a portion of the support material is made of a single layer thickness.

8. The apparatus according to claim 1, wherein at least a portion of the support material has a thickness exceeding single layer thickness.

9. The apparatus according to claim 1, wherein the support material is dispensed in a form of a grid.

10. The apparatus according to claim 1, wherein the support material is dispensed in a form of a grid also including ribs so that to provide additional strength as required.

11. The apparatus according to claim 1, wherein the 3D hollow object material deposition module is at least one of a group consisting of an inkjet module, extrusion module, and sintering module.

12. The apparatus according to claim 1, wherein the 3D hollow object material solidifying module solidifies the material by one of a group of radiations consisting of ultraviolet radiation, infrared radiation, microwave radiation, and heat.

13. The apparatus according to claim 1 wherein the support material dispensing module dispenses support material, which is at least one of a group of materials consisting of a metal grid, a plastic grid, a fabric grid, a grid made of material dissolvable in the 3D hollow object material, and a combination of all of the above.

14. An apparatus for manufacturing of large shells, said apparatus comprising:
    a material deposition module configured to deposit a portion of material forming at least a segment of a shell to be manufactured;
    a material solidifying module configured to solidify at least the portion of material deposited and forming at least a segment of the shell to be manufactured; and
    a support material dispensing module including a material stretching mechanism configured to dispense and stretch a support material across a cross section of the shell; and
    wherein the support material module dispenses the support material separately prior to or concurrently with the deposition of the portion of material forming at least a layer of a 3D hollow object wall and at a location other than that at which the 3D hollow object is being dispensed.

15. The apparatus according to claim 14, wherein the support material dispensing module dispenses the support material across a cross section contour of the 3D object including across a hollow or empty space inside the contour so that to fit precisely a planned contour outline in accordance with a generated model of the 3D object.

16. An apparatus for manufacturing of large shells, said apparatus comprising:
    a material deposition module configured to deposit a portion of material forming at least a segment of a shell to be manufactured;
    a material solidifying module configured to solidify at least the portion of material deposited and forming at least a segment of the large shell to be manufactured; and
    a support material dispensing module including a material stretching mechanism configured to dispense and stretch a support material across a cross section of the large shell; and
    wherein the support material dispensing module is configured to dispense the support material across a cross section contour of a 3D object including across an empty space inside the contour so that to fit exactly a planned contour outline in accordance with a generated model of a 3D object, wherein a size of the 3D object is at least 500 mm×500 mm×500 mm.

17. An apparatus for manufacturing of large shells having appendages, said apparatus comprising:
 a material deposition module configured to deposit a portion of material forming at least a segment of a shell to be manufactured;
 a material solidifying module configured to solidify at least the portion of material deposited and forming at least a segment of the shell to be manufactured; and
 a support material dispensing module configured to dispense the support material across a cross section of the shell; and
 wherein the support material is in a form of members defining a grid having a first surface and at least one second surface and at least one rib having a thickness greater than that of the members defining the grid; and
 wherein the material deposition module is configured to deposit material on the first surface forming at least a first portion of a shell to be manufactured and deposit material on the at least one second surface forming at least a second portion of a large shell to be manufactured.

18. The apparatus according to claim 17, wherein the support material dispensing module dispenses the support material across a cross section contour of the large shell including across a hollow or empty space inside the contour so that to fit exactly a planned contour outline in accordance with a generated model of the large shell.

19. The apparatus according to claim 17, wherein the grid is flat and the first surface and second surface are on opposite sides of the grid.

20. The apparatus according to claim 17, wherein the support material or grid has more than two surfaces laying in multiple planes in 3D space as required to provide optimal structural strength and stability to the large shells having appendages being manufactured.

\* \* \* \* \*